Sept. 29, 1925.

W. F. GONGAWARE 1,555,658

ILLUMINATED VANITY MIRROR FOR AUTOMOBILES

Filed May 31, 1924   2 Sheets-Sheet 1

INVENTOR

William F. Gongaware
By Kay, Totten & Martin
Attorneys

Sept. 29, 1925.   1,555,658
W. F. GONGAWARE
ILLUMINATED VANITY MIRROR FOR AUTOMOBILES
Filed May 31, 1924   2 Sheets-Sheet 2

INVENTOR
William F. Gongaware
By Kay, Totten & Martin,
Attorneys

Patented Sept. 29, 1925.

1,555,658

UNITED STATES PATENT OFFICE.

WILLIAM F. GONGAWARE, OF IRWIN, PENNSYLVANIA.

ILLUMINATED VANITY MIRROR FOR AUTOMOBILES.

Application filed May 31, 1924. Serial No. 716,991.

*To all whom it may concern:*

Be it known that I, WILLIAM F. GONGAWARE, a citizen of the United States, and resident of Irwin, in the county of Westmoreland and State of Pennsylvania, have invented a new and useful Improvement in Illuminated Vanity Mirrors for Automobiles; and I do hereby declare the following to be a full, clear, and exact description thereof.

My invention relates to mirrors for use when automobiling, and particularly to one which is intended for inspection of one's person by reflection.

My invention has for its object the provision of a mirror which when not in use may be kept out of the way, in a conveniently accessible place, and which may be withdrawn from its support by the user and which will be automatically illuminated when in use.

The device comprises a holder for a mirror and a lamp, which may be detachably mounted upon the instrument board or dash of an automobile or to the back surface of the front seat thereof, and may have electrical connections and a flexible conductor so arranged that when withdrawn from its supporting bracket the circuit through the lamp will be closed to illuminate the mirror, automatic winding mechanism being provided for taking up the slack of the flexible conductor when the combined mirror and lamp holder is returned to its support.

Figure 1:
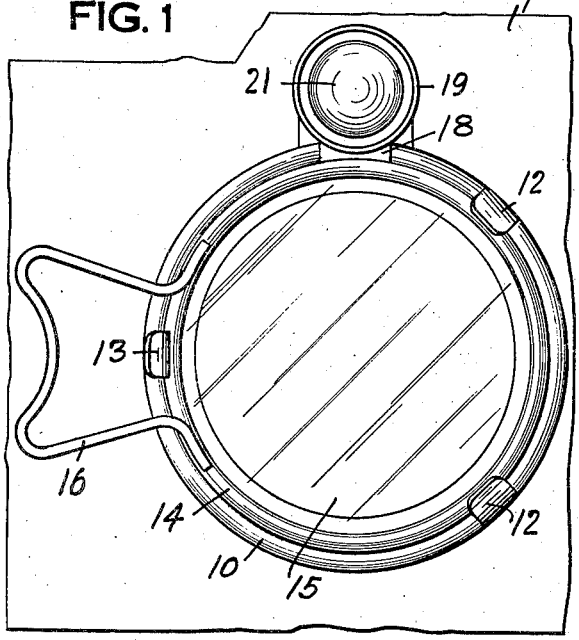
Figure 2:
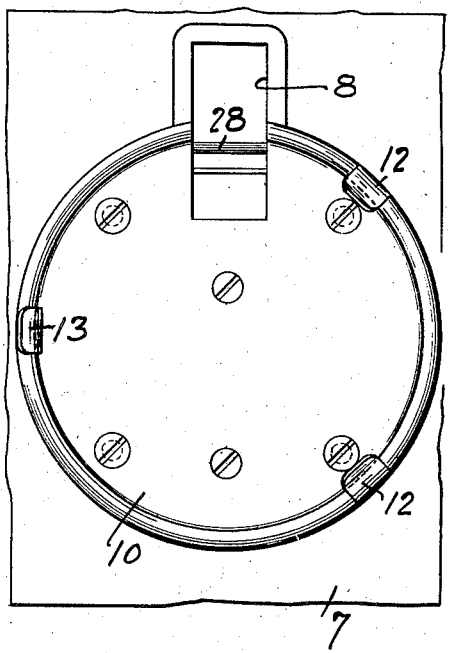
Figure 3:
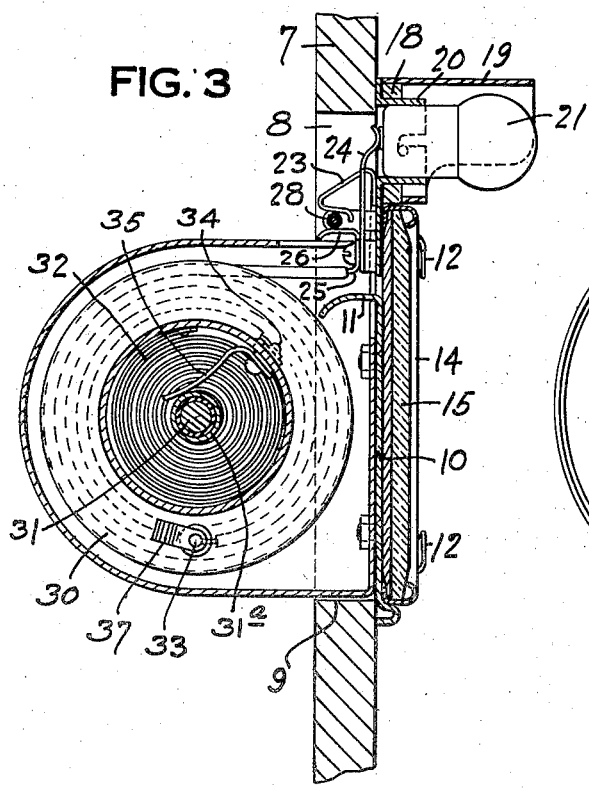
Figure 4:
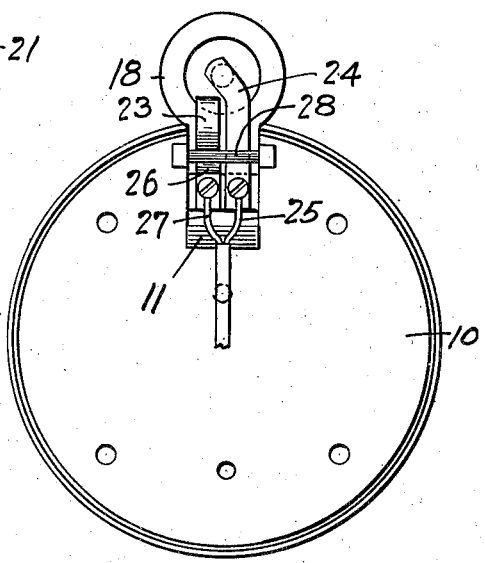
Figure 5:
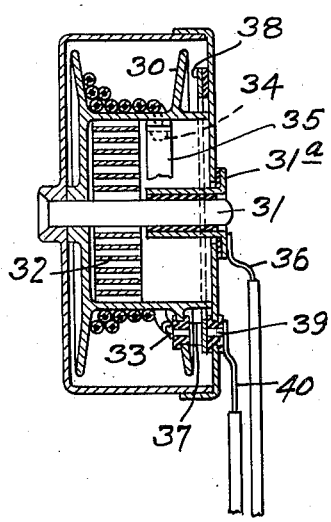
Figure 6:
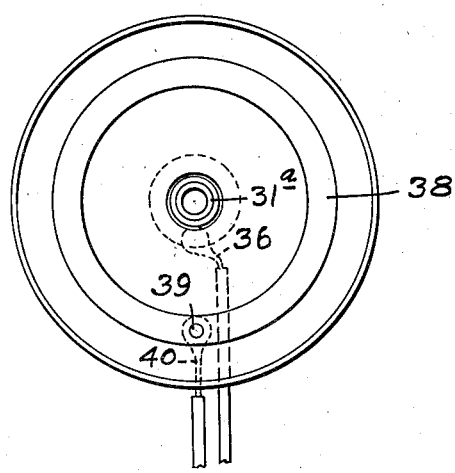
Figure 7:
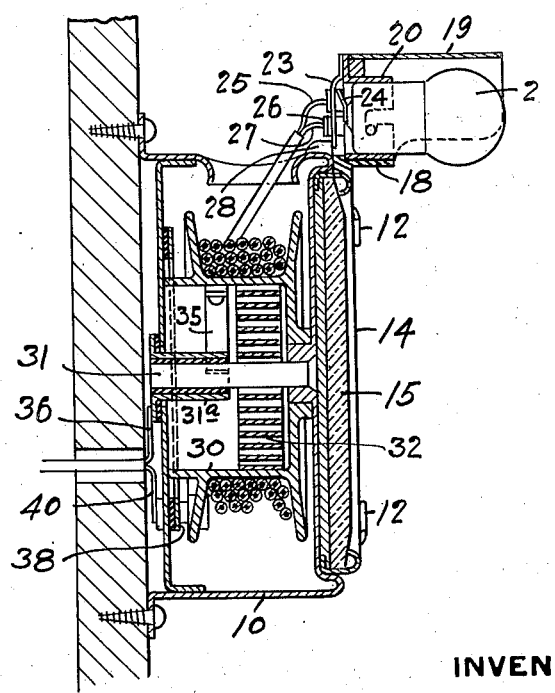

One form which my invention may take is shown in the accompanying drawing wherein Fig. 1 is a view, in front elevation, of a portion of an instrument board of a motor vehicle, with my device in place thereon; Fig. 2 is a similar view with the mirror of the device removed; Fig. 3 is an elevational sectional view taken at right angles to the view of Fig. 1; Fig. 4 is a view of the device in rear elevation; Fig. 5 is a vertical sectional view of the winding drum and parts associated therewith; Fig. 6 is an inside face view of the cover to the winding drum, and Fig. 7 is a modification of the general arrangement.

In Figs. 1 and 2, my device is shown as applied to a dash or instrument board 7 through which openings 8 and 9 are provided. The opening 9 may be of sufficient size to permit the removal of the drum 30 therethrough. A substantially circular metal plate 10 is secured to the dash 7 by screws or otherwise and is provided with an inturned rounded flange 11 extending within the opening 9, to function as a guiding sheave for a flexible conductor to be hereinafter described. The plate 10 is provided with struckup lugs 12 and 13. A metal casing 14, preferably substantially circular in form serves as a frame for a mirror or reflector 15, as shown more clearly in Fig. 2. A handle 16 is brazed or otherwise secured to the frame 14. The frame 14 is held in position upon the plate 10 by means of the lugs 12 and 13 which are preferably of yielding material, the lug 13 having its free end turned outwardly so that when the hand of the user grasps the handle 12, the thumb may be employed to bend the lug 13 outwardly slightly to permit withdrawal of that edge of the frame 14 from beneath the lug 13, after which the frame 14 may be moved a slight distance transversely to free it from the lugs 12.

A lamp holder 18 is secured to the frame 14 in any desired manner, so as to form a unitary structure therewith. The holder 18 is provided with a hood 19 and a lamp socket 20 which may be of any ordinary construction and in which a lamp 21 may be detachably secured as by a bayonet joint. The lamp socket is electrically connected to a yielding terminal member 23 and the base of the lamp 21 has connection with a yielding terminal member 24, which in turn has connection with a conductor 25 (Fig. 3). The terminals 23 and 24 are secured to and move with the frame 14. The terminal 23, when in closed position, engages a co-operating terminal member 26 to close the circuit from a conductor arm 24 and the conductor 25. The terminal 26 is also secured to the frame 14 but is insulated therefrom. An insulating member 28 is secured to the plate 10. It will be seen that when the frame 14, with the attached yielding conductors 23 and 26, is withdrawn from the dash, the arm 23 will move into engagement with the arm 26 to close the circuit as above explained, thus effecting illumination of the mirror 15 by the lamp 21, and that when the frame 14 is returned to its seat on the dash 7 the fixed member 28 will move the conductors 23 and 26 apart thus breaking the circuit.

It will be apparent that in order to permit removal of the frame 14 from the dash the flexible conductors 25 and 27 must be carried with it. In order to accomplish this I provide a drum 30 revolubly mounted upon a shaft 31, and provided with a spring 32, one end of which is secured to the shaft and the other end of which is secured to the drum, so that when the drum is unwound the spring will be placed under tension and cause a rewinding movement of the drum when the unwinding force is removed. The conductors 25 and 27 are normally wound on the drum and have their opposite ends, respectively, connected to terminals 33 and 34. The terminal 34 has electrical connection with a spring contact arm 35 that engages a sleeve 31ª on the shaft 31 to which a conductor 36 leading to one side of the battery or generator is connected, while the terminal 33 is connected to a yielding contact 37 that engages a slip ring 38 which is provided with a terminal 39, a conductor 40 leading from the terminal 39 to the other side of the battery or the generator.

It will be seen that as the drum 30 is unwound by a pull exerted upon the conductors 25 and 27 when the frame 14 is removed to bring the mirror close to the person of the user, the electrical connection is maintained during rotation of the drum, by reason of the engagement between the spring arm 35 and the sleeve 31ª and by reason of the engagement between the contact 37 and slip ring 38.

In Fig. 7 I have shown a manner in which the device may be applied to the rear side of a seat. In that case it will be seen that the drum is preferably disposed in a plane at right angles to that in which it lies in Fig. 2; the electrical connections being substantially the same in both instances.

Various changes in detail and general arrangement may be made in the device without departing from the spirit and scope of the invention as defined in the accompanying claims.

I claim as my invention:

1. A vanity mirror construction comprising a supporting member, a frame detachably supported by said member, a mirror on said frame, an electric lamp secured to said frame, flexible conductors connected to said lamp, a slack take-up device for said flexible conductors, the flexible conductors being extensible to a position remote from said support, and a circuit interrupter automatically operable to close the lamp circuit upon movement of the frame from its seat on said support.

2. The combination with a base member, of a rewinding drum secured thereto, a flexible conductor on said drum, an electric lamp connected to the outer end of said conductor, a mirror mounted in fixed relation to the lamp, detachable means for permitting removal of the lamp from a normally fixed position, and means for automatically interrupting the circuit upon return of the lamp to said fixed position.

3. The combination with a combined mirror and electric lamp supporting frame, of a support therefor, means for detachably securing said frame to said support, a pair of relatively movable contact members carried by said frame and closing the circuit through the lamp, and a lug on said support disposed in position to separate said contact members when the said frame is seated on said support.

In testimony whereof I, the said WILLIAM F. GONGAWARE, have hereunto set my hand.

WILLIAM F. GONGAWARE.